United States Patent [19]

Coates et al.

[11] Patent Number: 5,323,251

[45] Date of Patent: Jun. 21, 1994

[54] ELECTROOPTICAL LIQUID CRYSTAL SYSTEM

[75] Inventors: David Coates; Patrick Nolan, both of Poole, United Kingdom

[73] Assignee: Merck Patent Gesellschaft mit Beschrankter Haftung, Darmstadt, Fed. Rep. of Germany

[21] Appl. No.: 960,469

[22] PCT Filed: Oct. 28, 1992

[86] PCT No.: PCT/EP92/02461

§ 371 Date: Dec. 16, 1992

§ 102(e) Date: Dec. 16, 1992

[30] Foreign Application Priority Data

Nov. 1, 1991 [EP] European Pat. Off. ............ 91710039
Mar. 10, 1992 [EP] European Pat. Off. ............ 92104091

[51] Int. Cl.$^5$ .................................................. G02F 1/13
[52] U.S. Cl. ........................................ 359/51; 359/103; 252/299.01
[58] Field of Search ............................... 359/51, 103; 252/299.01

[56] References Cited

U.S. PATENT DOCUMENTS 5,011,624 4/1991 Yamagishi et al. .................... 359/52
5,021,188 6/1991 Vaz et al. ............................... 359/51

FOREIGN PATENT DOCUMENTS 275999 1/1988 European Pat. Off. .
89/06264 7/1989 PCT Int'l Appl. .

OTHER PUBLICATIONS

Yamagishi et al., "Morphological Control in Polymer--Dispersed Liquid Crystal Film Matrices", SPIE, vol. 1080 (1989), pp. 24–27.

Hirai et al., "Phase Diagram and Phase Separation in LC/Prepolymer Mixture", SPIE vol. 1257 (1990), pp. 2–8.

Primary Examiner—William L. Sikes
Assistant Examiner—Huy Mai
Attorney, Agent, or Firm—Millen, White, Zelano & Branigan

[57] ABSTRACT

An electrooptical system
  which between 2 electrode layers contains a PDLC film comprising a liquid crystal mixture forming microdroplets in an optically isotropic, transparent polymer matrix,
  in which one of the electrode layers forms an active matrix having nonlinear addressing elements integrated with the image point, which the other electrode layer forms the counter electrode,
  in which one of the refractive indices of the liquid crystal mixture is matched to the refractive index of the polymer matrix,
  the transmission of which can be varied depending on an applied electrical voltage, essentially independent of the polarization of the incident light.

22 Claims, 4 Drawing Sheets

FIG. 4

ELECTROOPTICAL LIQUID CRYSTAL SYSTEM

BACKGROUND OF THE INVENTION

1. Field of the Invention

The invention relates to an electrooptical liquid crystal system
which between 2 electrode layers contains a PDLC film comprising a liquid crystal mixture being dispersed in form of microdroplets in an optically isotropic, transparent polymer matrix,
in which one of the refractive indices of the liquid crystal mixture is matched to the refractive index of the polymer matrix, and
which in one of the two switching states has a reduced transmission compared with the other state, essentially independent of the polarization of the incident light.

2. Description of the Related Art

The preparation of PDLC (=polymer dispersed liquid crystal) films is described, for example, in U.S. Pat. No. 4,688,900, Mol. Cryst. Liq. Cryst. Nonlin. Optic, 157, 1988, 427–441, WO 89/06264 and EP 0,272,585. In the so-called PIPS technology (=polymerization-induced phase separation) the liquid crystal mixture is first homogenously mixed with monomers and/or oligomers of the matrix-forming material; phase-separation is then induced by polymerization. Differentiation must further be made between TIPS (temperature-induced phase separation) and SIPS (solvent-induced phase separation) (Mol. Cryst. Liq. Cryst. Inc. Nonlin. Opt. 157 (1988) 427) both also being methods to produce PDLC films.

The process of preparation must be controlled very carefully in order to obtain systems with good electro-optical properties. F. G. Yamagishi et al., SPIE Vol. 1080, Liquid Crystal Chemistry, Physics and Applications, 1989, p.24 differentiate between a "Swiss cheese" and a "polymer ball" morphology. In the latter one, the polymer matrix consists of small polymer particles or "balls" being connected or merging into each other while in the Swiss cheese system, the polymer matrix is continuous and exhibits well defined, more or less spherical voids containing the liquid crystal. The Swiss cheese morphology is preferred because it exhibits a reversible electrooptical characteristic line while the polymer ball system shows a distinct hysteresis generally leading to a drastic deterioration of the electrooptical characteristic line when comparing the virgin and the second run.

According to Yamagishi et al., loc. cit., the Swiss cheese morphology is promoted in case the polymerization reaction runs via a step mechanism, and in WO 89/06264 it is pointed out that the step mechanism is favored in case the precursor of the polymer matrix consists of multifunctional acrylates and multifunctional mercaptanes. Another important point which can be influenced by a careful selection of process parameters such as curing temperature, relative concentration and choice of the components of the prepolymer etc., is the mean size of the microdroplets. The mean droplet size generally influences the threshold voltage, the switching times, the on-state transmission and other properties of the PDLC film. Experimental methods for influencing the average droplet size are described, for example, in U.S. Pat. No. 4,673,255 and in J. L. West, Mol. Cryst. Liq. Cryst. Inc. Nonlin. Opt., 157, 1988, 427. In U.S. Pat. No. 4,673,255, average drop diameters between 0.1 $\mu$m and 8 $\mu$m are given, while, for example, a matrix which is based on a glass monolith has pores having a diameter between 15 and 2,000 Å. For the mesh width of the network of PN systems, a preferred range between 0.5 and 2 $\mu$m is given in EP 0,313,053.

In PDLC films, one of the refractive indices of the liquid crystal mixture, customarily the ordinary refractive index $n_o$, is selected in such a way that it more or less coincides with the refractive index $n_p$ of the polymeric matrix. If no voltage is applied to the electrodes, the liquid crystal molecules in the droplets exhibit a distorted alignment, and incident light is scattered at the phase boundary between the polymeric and liquid crystal phases.

On applying a voltage, the liquid crystal molecules are aligned parallel to the field and perpendicular to the E vector of the transmitted light. Normally incident light (viewing angle $\theta=0°$) now sees an optically isotropic medium and appears transparent.

No polarizers are required for operating PDLC systems, as a result of which these systems have high transmission. PDLC systems provided with active matrix addressing have been proposed on the basis of these favorable transmission properties in particular for projection applications, but in addition also for displays having high information content and for further applications.

The liquid crystal mixtures used for producing PDLC systems have to meet a wide range of demands. One of the refractive indices of the liquid crystal mixture is selected such that it matches with the refractive index of the polymer matrix. The term matching of refractive indices used here covers not only the case $n_o$ (resp. another refractive index of the liquid crystal mixture)—$n_p$, but also the condition $n_o$ (resp. another refractive index of the liquid crystal mixture)$<n_p$ which is sometimes chosen to reduce off-axis haze and enlarge the view angle as described, for example, in EP 0,409,442.

The liquid crystal mixture preferably has a positive dielectric anisotropy but the use of dielectrically negative liquid crystal mixtures (see, for example, WO 91/01511) or two-frequency liquid crystal mixtures (see, for example, N. A. Vaz et al., J. Appl. Phys. 65, 1989, 5043) is also discussed.

Furthermore, the liquid crystal mixture should have a high clearing point, a broad nematic range, no smectic phases down to low temperatures and a high stability and should be distinguished by an optical anisotropy $\Delta n$ and a flow viscosity $\eta$ which can to optimized with respect to the particular application, and by a high electrical anisotropy.

A series of matrix materials and polymerization processes have hitherto been proposed for producing PDLC system. The PIPS, SIPS and TIPS technologies are described in some detail in Mol. Cryst. Liq. Cryst. Inc. Nonlin. Optics, 157, 1988, 427. The PDLC systems described in Mol. Cryst. Liq. Cryst. Inc. Nonlin. Optics, 157, 1988, 427 are based on an epoxy film, while in EP 0,272,585 acrylate systems are given. The PDLC system of WO 89/06264 is based on multifunctional acrylates and multifunctional thiols, and Y. Hirai et al., SPIE Vol. 1257, Liquid Crystal Displays and Applications, 1990, p.2 describe PDLC system the precursor of the polymer matrix of which being based on monomers and oligomers. Further suitable matrix materials are described, for example, in U.S. 3,935,337, WO 91/13126, EP 0,205,261 and in further references.

Electrooptical systems containing PDLC films can be addressed passively or actively. Active driving schemes employing an active matrix having nonlinear addressing elements integrated with the image point, are especially useful for displays with high information content. The nonlinear elements used for preparing the active matrix type electrode film can have 2 or 3 connections. Examples of elements having 2 connections are a-Si:H diodes (N. Szydlo et al., Proc. 3rd Int. Display Res. Conf., Kobe; SID Los Angeles, 1983, p. 416), NINa-Si:H diodes (Z. Yaniv et al., Conf. Rec. 1985 Intern. Display Research Conference, IEEE, New York, 1985, p. 76), a-Si:H ring diodes (S. Togashi et al., Proceedings of the 4th International Display Research Conference, SEE, Paris, 1984, p. 141), MIM or MSI diodes (metal-insulator-metal, metal-silicon nitrideindium tin oxide; D. R. Baraff et al., Digest SID International Symposium, Los Angeles, 1980, p. 200; M. Suzuki et al., Proceedings of the 6th International Display Research Conference, Japan Display '86, 1986, p. 72) or ZnO varistores (D. E. Castleberry et al., SID '82 Digest, 1982, p. 246). The nonlinear elements having 3 connections are thin film transistors (TFT), of which several types are discussed and which differ in the semiconductor material used (for example a-Si:H, p-Si, CdSe, Te and other materials; see, for example, P. M. Knoll, Displays, Heidelberg 1986, p. 216; T. Nishimura, Mat. Res. Soc. Symp. Proc. 33, (1984) 221; C. S. Bak et al., Mat. Res. Soc, Symp. Proc. 33 (1984) 215; W. G. Hawkins et al., Mat. Res. Soc. Symp. Proc. 33, (1984) 231; M. Matsuura et al., SID 1983 Symposium Digest, 1983, p. 148).

When nonlinear elements having 3 connections are used, only one connection is usually required for the counter electrode, while in the case of active matrix addressings, which are based on elements having 2 connections, the counter electrode is usually also scanned. However, active matrix addressings based on elements having 2 connections and in which only one electrode is scanned have also been proposed (Y. Baron et al., Proceedings of the 6th International Research Conference 1986, Japan Display '86, p. 86), and furthermore the use of TFTs as an element having only 2 connections has also been discussed (C. Hilsum et al., Displays, January 1986 p. 37).

More details on the addressing of liquid crystal displays by an active matrix of nonlinear elements can be found, for example, in A. H. Firester, SID, 1987, Society for information Display Seminar, Seminar 5: Active Matrices for Liquid Crystals, E. Kaneko, Liquid Crystal Displays, KTK Scientific Publishers, Tokyo, Japan, 1987, chapter 6 and 7 or P. M. Knoll, Display, Heidelberg, 1986, p. 216 ff.

When the PDLC system is addressed by means of an active matrix, a further far reaching criterion is added to the requirements listed so far which must be fulfilled by the cured polymer and the liquid crystal mixture being embedded in microdroplets. This is related to the fact that each image point represents a capacitive load with respect to the particular active nonlinear element, which is charged at the rhythm of the addressing cycle. In this cycle, it is of paramount importance that the voltage applied to an addressed image point drops only slightly until the image point is again charged in the next addressing cycle. A quantitative measure of the drop in voltage applied to an image point is the so-called holding ratio (HR) which is defined as the ratio of the drop in voltage across an image point in the nonaddressed state and the voltage applied; a process for determining the HR is given, for example, in Rieger, B. et al., Conference Proceeding der Freiburger Arbeitstagung Flussigkristalle (Freiburg Symposium on Liquid Crystals), Freiburg 1989. Electrooptical systems having a low or relatively low HR show insufficient contrast.

It is true that considerable efforts have already been undertaken hitherto in order to optimize PDLC systems with respect to the liquid crystal mixture used and the polymer system. On the other hand, however, it is still an open problem how to reliably obtain PDLC films with Swiss cheese morphology. Furthermore, only few investigations of PDLC systems having active matrix addressing can be found in the literature, and no concepts have so far been proposed for providing electrooptical systems having a high HR and a Swiss cheese morphology.

A further serious problem is often that the liquid crystal mixture has insufficient miscability with the monomers, oligomers and/or prepolymers of the polymer used for forming the matrix, which limits in particular the use of PIPS technology in microdroplet matrix systems.

A further disadvantage is in particular that the liquid crystal mixture or individual components of the liquid crystal mixture are in many cases distinguished by an excessively high and/or significantly temperature dependent solubility in the cured, matrix-forming polymer. If, for example, the solubility or the temperature-dependence of the solubility of one or several components differs quite significantly from that of the remaining components, it may happen that the physical properties of the mixture and in particular also of the refractive indices ne and no are substantially affected, which disturbs the adjustment of $n_o$ or $n_e$ or another refractive index of the liquid crystal mixture to $n_M$, thus resulting in deterioration of the optical properties of the system. The "bleeding" described in EP 0,357,234, according to which at least some of the liquid crystal droplets have the tendency, when the matrix film is subjected to mechanical stress, to dissolve with diffusion of the liquid crystal to the film surface or into the matrix, is favored by a high solubility of the liquid crystal mixture in the cured polymer.

Consequently, there is a high demand for PDLC systems which fulfill to a large extent the requirements described and which reliably exhibit a Swiss cheese morphology. Furthermore, there is a high demand for actively addressed PDLC systems which exhibit a high HR in addition to a Swiss cheese morphology.

SUMMARY OF THE INVENTION

The object of the invention was to provide PDLC systems of this type and precursors of these PDLC systems containing monomers, oligomers and/or prepolymers of the polymer used and a liquid crystal mixture. Other aims of the present invention are immediately evident to the person skilled in the art from the following detailed description.

It has been found that PDLC systems which exhibit a Swiss cheese morphology can be obtained if the precursor of the PDLC system comprises a) 30–85 wt. % of a liquid crystal mixture containing one or more compounds of the formula I in which

Z¹ and Z², independently of one another, are a single bond,

—CH$_2$CH$_2$—, —COO—, —OCO— or —C≡C—, independently of one another, are trans-1,4-cyclohexylene, 1,4-phenylene, 2-fluoro-1,4-phenylene, 3-fluoro-1,4-phenylene, 2,3-difluoro-1,4-phenylene or 3,5-difluoro-1,4-phenylene and one of and is also pyrimidine-2,5-diyl, pyridine-2,5-diyl or trans-1,3-dioxane-2,5-diyl, X¹ and X², independently of one another, are H or F,
Q is CF$_2$, OCF$_2$, C$_2$F$_4$, OC$_2$F$_4$ or a single bond,
Y is H, F, Cl or CN,
n is 0, 1 or 2 and
R is alkyl having up to 13 C atoms, in which one or two non-adjacent CH$_2$ groups can also be replaced by —O— and/or —CH=CH—, b) 15–68 wt. % of the precursor of the polymer matrix at least comprising
  a component A containing 0.1–35 wt. % of one or more at least difunctional thiol monomers and/or oligomers
  a component B containing 5–95 wt. % of one or more monomers of the ene type, and
  a component C containing 2–55 wt. % of one or more oligomers of the ene type and
c) 0.1–5 wt. % of a radical photoinitiator with the mass ratios given under a), b) and c) being related to the mass of the precursor of the PDLC film and the mass ratios of the components A, B and C relating to the mass of the precursor of the polymer matrix.

Furthermore, it has been found that PDLC systems which are characterized by a Swiss cheese morphology and a high HR can be obtained if the percentage of the carbonitrile compounds according to formula I is not too high and especially not more than 15%. Especially preferred for active matrix applications are PDLC system the liquid crystal mixture of which contains less than 5% and in particular no carbonitriles.

The invention thus relates to an electrooptical liquid crystal system
  which between 2 electrode layers contains a PDLC film comprising a liquid crystal mixture forming microdroplets in an optically isotropic, transparent polymer matrix,
  in which one of the refractive indices of the liquid crystal mixture is matched to the refractive index of the polymer matrix,
  which in one of the two switching states has reduced transmission compared with the other state, essentially independent of the polarization of the incident light,
  whose precursor of the PDLC film is selected as stated above.

The construction of the electrooptical system according to the present invention corresponds to the customary mode of construction for systems of this type. The term customary mode of construction is in this case broadly interpreted and includes all adaptations and modifications.

Thus, for example, the matrix formed by the transparent medium in which the liquid crystal mixture is microdispersed or microencapsulated, is arranged between conducting electrodes like a sandwich.

The electrodes are applied, inter alia, to substrate sheets of, for example, glass, plastic or the like; if desired, however, the matrix can also be provided directly with electrodes so that the use of substrates can be avoided. One of the electrodes forms an active matrix while the other one acts as counter electrode.

The electrooptical system according to the invention can be operated reflectively or tramsmissively so that at least one electrode and, if present, the associated substrate are transparent. Both systems customarily contain no polarizers, as a result of which a distinctly higher light transmission results. Furthermore, no orientation layers are necessary, which is a considerable technological simplification in the production of these systems compared with conventional liquid crystal systems such as, for example, TN or STN cells.

Processes for the production of PDLC films are described, for example, in U.S. Pat. No. 4,688,900, U.S. Pat. No. 4,673,255, U.S. Pat. No. 4,671,618, WO 85/0426, U.S. Pat. No. 4,435,047, EP 0,272,595, Mol. Cryst. Liq. Cryst, Inc. Nonlin. Opt. 157 (1988) 427, Liquid Crystals, 3 (1988) 1543, EP 0,165,063, EP 0,345,029, EP 0,357,234 and EP 0,205,261. The formation of the PDLC film is generally achieved by 3 basic methods: in the PIPS technique (=PIPS, polymerization induced chase separation) the liquid crystal mixture, and optionally further additives, are dissolved in the precursor of the matrix material, and subsequently polymerization is started. TIPS (=thermally induced phase separation) means that the liquid crystal mixture is dissolved in the melt of the polymer followed by cooling while SIPS (=solvent induced phase separation) starts with dissolving the polymer and the liquid crystal mixture in a solvent with subsequent evaporation of the solvent. The invention is, however, not restricted to these specific techniques but covers also electrooptical systems obtained by modified methods or other methods. The use of the PIPS technology is usually preferred.

The thickness d of the electrooptical system is customarily chosen to be small in order to achieve a threshold voltage $V_{th}$ which is as low as possible. Thus, for example, layer thicknesses of 0.8 and 1.6 mm are reported in U.S. Pat. No. 4,435,047, while values for the layer thickness between 10 and 300 [μm are given in U.S. Pat. No. 4,688,900 and between 5 and 30 μm in EP 0,313,053. The electrooptical systems according to the invention only have layer thicknesses d greater than a few mm in exceptional cases; layer thicknesses below 200 μm and especially below 100 μm are preferred. In particular, the layer thickness is between 2 and 50 μm and especially between 3 and 25 μm.

An essential difference between the electrooptical liquid crystal system according to the present invention and those customary hitherto exists, however, in that the precursor of the PDLC film comprises a) 30–85 wt. % of a liquid crystal mixture containing at least one compound of formula I b) 15–68 wt. % of the precursor of the polymer matrix at least comprising     a component A containing 0.1–35 wt. % of one or more at least difunctional thiol monomers and/or oligomers, a component B containing 5–95 wt. % of one or more oligomers of the ene type, and     a component C containing 2–55 wt. % of one or more oligomers of the ene type, and c) 0,1–5 wt. % of a radical photoinitiator with the mass ratios given under a), b) and c) being related to the mass of the precursor of the PDLC film and the mass ratios of the components A, B and C relating to the mass of the precursor of the polymer matrix.

In the following, for the sake of simplicity, Phe is 1,4-phenylene, Phe.2F is 2-fluoro-1,4-phenylene, Phe.3F is 3-fluoro-1,4-phenylene, Cyc is trans-1,4-cyclohexylene, Pyr is pyrimidine-2,5-diyl and Pyd is pyridine-2,5-diyl-, the two abbreviations Pyr and Pyd comprising in each case the two possible positional isomers. Furthermore, Phe.(F) is intended to designate a 1,4-phenylene group which may be unsubstituted or monosubstituted by fluorine in the 2 or 3 position. Phe.2F3F and Phe.3F5F are a 1,4-phenylene group which is difluorinated in the 2 and 3 and 3 and 5 positions respectively. Liquid crystal compounds according to formula I, wherein Y is H, F or Cl will be termed in the following as SFM compounds (superfluorinated materials) according to formula I.

Electrooptical systems whose liquid crystal mixture contains one or more binuclear compounds of the formula I2 are preferred:

In the compounds of the formula I2, R is preferably alkyl or alkoxy having 1–10, but in particular 1–8, C atoms, the straight-chain radicals being preferred. Furthermore, n-alkoxyalkyl compounds and in particular n-alkoxymethyl and n-alkoxyethyl compounds are preferred.

$Z^2$ is preferably —CH$_2$CH$_2$—, —COO— or a single bond, in particular a single bond or —CH$_2$CH$_2$— and very particularly a single bond. Y is —F, —Cl, —CN, —OCHF$_2$, —OCF$_3$ or —CF$_3$ preferably —F, —Cl or —CN; in case of actively addressed PDLC systems according to the present invention Y is preferably —F, —Cl or —OCF$_3$.

Compounds of the formula I2 in which at least one of $X^1$ and $X^2$ is different from H are particularly preferred.

is preferably Cyc, Phe.(F), Phe.3F5F, Phe.2F3F, Pyr, Pyd or Dio and in particular Cyc, Phe.(F), Phe.3F5F, Phe.2F3F, Pyr or Pyd.

Furthermore, electrooptical systems whose liquid crystal mixture contains one or more trinuclear compounds of the formula I3 are preferred:

In the compound of the formula I3, R is preferably n-alkyl or n-alkoxy having 1–10 C atoms, furthermore also n-alkoxymethyl or n-alkoxyethyl having 1–8 C atoms and n-alkenyl having up to 7 C atoms.

Very particular preference is given to compounds of the formulae I3 in which R is methyl, ethyl, propyl, butyl, pentyl, hexyl, heptyl, octyl, nonyl, decyl, methoxy, ethoxy, propoxy, butoxy, pentoxy, hexoxy, heptoxy, octoxy, methoxymethyl, ethoxymethyl, propoxymethyl, butoxymethyl, methoxyethyl, ethoxyethyl or propoxyethyl. $Z^1$ and $Z^2$ in the compounds of the formulae I3 are, independently of one another, preferably —CH$_2$CH$_2$—, —COO— or a single bond and in particular —CH$_2$CH$_2$— or a single bond. Particular preference is given to those compounds of the formula I3 in which at least one of $Z^1$ or $Z^2$ is a single bond. Y is —F, —Cl, —CN, —OCHF$_2$, —OCF$_3$ or —CF$_3$ and preferably —F, —Cl, —CH, —OCHF$_2$ or —OCF$_3$; in case of actively addressed PDLC systems according to the present invention Y is in particular —F, —Cl, —OCHF$_2$ and —OCF$_3$.

are, independently of one another, Cyc, Phe.(F), Phe.2F3F, Phe.3F5F, Phe.2F3F5F, Pyr, Pyd and Dic and in particular Cyc, Phe.(F), Phe.2F3F, Phe.3F5F, Phe.2F3F5F, Pyr and Pyd.

Furthermore, electrooptical systems whose liquid crystal mixture contains one or more tetranuclear compounds of the formula I4 are preferred:

In the compounds of the formulae I4, R is preferably n-alkyl or n-alkoxy having 1-10 C atoms, furthermore also n-alkoxymethyl or n-alkoxyethyl having 1-8 C atoms.

Very particular preference is given to compounds of the formulae I4 in which R is methyl, ethyl, propyl, butyl, pentyl, hexyl, heptyl, octyl, nonyl, decyl, methoxy, ethoxy, propoxy, butoxy, peritoxy, hexoxy, heptoxy or octoxy.

In the compounds of the formula I4, preferably not more than 2 and in particular only one of the bridges $Z^1$ and $Z^2$ are different from a single bond.

are preferably, independently of one another, Cyc, Phe.2F, Phe.3F, Phe, Pyr or Pyd. Compounds of the formula I4 in which at least one of is Phe.2F or Phe.3F are preferred. The weight proportion of the compounds of the formulae I4 in the liquid crystal mixture of the electrooptical systems according to the invention is preferably not too high and is in particular less than 20%, the use of laterally fluorinated compounds of the formula I4 being in many cases preferred.

The proportion of the compounds of the formula I in the liquid crystal mixtures used according to the invention is preferably not too small and is in particular more than 15% and very particularly more than 20%. Liquid crystal mixtures containing more than 40% and in particular not less than 50% of compounds of the formula T are particularly preferred.

The liquid crystal mixtures used according to the invention can contain further components which are preferably selected from nematic or nematogenic (monotropic or isotropic) substances, in particular substances from the group comprising azoxybenzenes, benzylideneanilines, biphenyls, terphenyls, phenyl or cyclohexyl benzoates, phenyl or cyclohexyl cyclohexanecarboxylates, phenyl or cyclohexyl cyclohexylbenzoates, phenyl or cyclohexyl cyclohexylcyclohexanecarboxylates, cyclohexylphenyl benzoate,cyclohexylphenyl cyclohexanecarboxylate, or cyclohexylphenyl cyclohexylcyclohexanecarboxylate, phenylcyclohexanes, cyclohexylbiphenyls, phenylcyclohexylcyclohexanes, cyclohexylcyclohexanes, cyclohexylcyclohexenes, cyclohexylcyclohexylcyclohexenes, 1,4-bis(cyclohexyl)benzenes, 4,4'-bis(cyclohexyl)biphenyls, phenyl- or cyclohexylpyrimidines, phenyl- or cyclohexylpyridines, phenyl- or cyclohexyldioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl)ethanes, 1-cyclohexyl-2-biphenylylethanes, 1-phenyl-2-cyclohexylphenylethanes, halogenated or unhalogenated stilbenes, benzyl phenyl ethers, tolans and substituted cinnamic acids. The 1,4-phenylene groups in these compounds can also be fluorinated.

The liquid crystal mixtures used in the electrooptical systems according to the invention preferably also contain one or more dielectrically neutral compounds of the formulae 1-5:

$$R''—L—E—R'''$$  1

$$R''—L—CH_2CH_2—E—R'''$$  2

In the formlae 1 and 2 L and E, which may be identical or different, are each, independently of one another, a bivalent radical from the group comprising —Phe—, —Cyc—, —Phe—Phe—, —Phe—Cyc—, —Cyc—Cyc—, —Pyr—, —Dio—, —G—Phe— and —G—Cyc— and mirror images thereof, Phe being unsubstituted or fluorine-substituted 1,4-phenylene, Cyc being trans-1,4-cyclohexylene or 1,4-cyclohexenylene, Pyr being pyrimidine-2,5-diyl or pyridine-2,5-diyl, Dio being 1,3-dioxane-2,5-diyl and G being 2-(trans-1,4-cyclohexyl)ethyl, pyrimidine-2,5-diyl, pyridine-2,5-diyl or 1,3-dioxane-2,5-diyl.

One of the radicals L and E is preferably Cyc, Phe or Pyr. E is preferably Cyc, Phe or Phe-Cyc. The liquid crystals according to the invention preferably contain one or more components selected from compounds of the formulae 1 and 2, in which L and E are selected from the group comprising Cyc, Phe and Pyr and simultaneously one or more components are selected from the compounds of the formulae 1 and 2, in which one of the radicals L and E is selected from the group comprising Cyc, Phe and Pyr and the other radical is selected from the group comprising —Phe—Phe—, —Phe—Cyc—, —Cyc—Cyc—, —G—Phe— and —G—Cyc—, and, if desired, one or more components are selected from the compounds of the formulae 1 and 2, in which the radicals L and E are selected from the group comprising —Phe—Cyc—, —Cyc—Cyc—, —G—Phe— and —G—Cyc—.

R''' and R'' in the compounds of the formulae 1 and 2 are each, independently of one another, preferably alkyl, alkenyl, alkoxy, alkenyloxy or alkanoyloxy having up to 8 carbon atoms. In most of these compounds, R''' and R'' are different from one another, one of these radicals being in particular alkyl, alkoxy or alkenyl.

Especially preferred is the following smaller group of dielectrically neutral compounds of formulae 3 and 4 wherein
the meaning of R'' and R''' is the same as given for formulae 1 and 2,
Z is independently from each other a single bond or —CH$_2$CH$_2$—, l and m are independently from each other 0 or 1, and denotes 1,4-phenylene, 2-fluoro-1,4-phenyle or 3-fluoro-1,4-phenylene.

The weight proportion of the compounds of the formulae 1-4 in the liquid crystals used according to the invention is preferably 0-50% and in particular 0-40%.

The liquid crystal mixtures used in the electrooptical systems according to the invention preferably contain 1-98%, in particular 5-95%, of compounds of the formula I. The liquid crystals preferably contain 1-20, but in particular .1-15, and very particularly 1-12, compounds of the formula I.

One skilled in the art can select additives for the liquid crystal mixtures described from the large pool of nematic or nematogenic substances in such a manner that the birefringence $\Delta n$ and/or the ordinary refractive index $n_o$ and/or other refractive indices and/or the viscosity and/or the dielectric anisotropy and/or further parameters of the liquid crystal are optimized with respect to the particular application.

The liquid crystal mixture can contain further additives such as, for example, chiral compounds and other customary additives. The concentration of such additives is preferably not more than 7.5% and, in particular, lower than 5%.

EXAMPLES

In SPIE Vol. 1257, Liquid Crystal Displays and Applications, p. 2-8, Y. Hirai et al. propose a PDLC display the polymer matrix of which is based on a precursor containing both oligomers and monomers, and they support that for a cyanobiphenyl based mixture like, for example, E 8 of Merck Ltd., Poole, GB the Swiss cheese morphology of the matrix which is necessary to obtain a reversible electrooptical characteristic line, can be produced. In the following table 1 the morphology obtained when using the cyanobiphenyl based mixture E 7 of Merck Ltd., Poole, GB, in monomer/oligomer mixtures, is shown:

TABLE 1

| liquid crystal mixture | precursor of the polymer matrix | | morphology of the PDLC film |
|---|---|---|---|
| | monomer | oligomer | |
| 50% E 7 | 25% BA | 25% E 270 | wrong morphology |
| 60% E 7 | 24% BA | 16% E 270 | Swiss cheese morphology |
| 90% E 7 | 6% BA | 4% E 270 | wrong morphology |

In Table 1 BA means butyl acrylate, E 270 is the commercially available oligomer Ebecryl 270 and the liquid crystal mixture E 7 consists of
51% of 4-pentyl-4'-cyanobiphenyl
25% of 4-heptyl-4'-cyanobiphenyl
16% of 4-octyl-4'-cyanobiphenyl
8% of 4-pentyl-4'''-cyanoterphenyl All percentages given above and in the following are percents by weight.

The liquid crystal mixture and the prepolymer of the polymer matrix are mixed to give a homogenous solution to which 1% of the radical photoinitiator Darocur® (available through E. Merck, Darmstadt, Germany) is added. The solution is capillary filled between 2 transparent glass slides (cell gap 15 μm) optionally coated with electrode layers. The system is then exposed to an Argon lamp and the cured PDLC film is inspected by microscopy.

One can derive from table 1 that the correct Swiss cheese morphology can be obtained for specific concentrations of oligomers and monomers. When changing the nature of the liquid crystal mixture, however, a drastic deterioration of the morphology obtained is often observed. Using, for example, a liquid crystal mixture consisting of carbonitrile compounds according to formula I 6.75% of 4-ethyl-4'-cyanobiphenyl
18.76% of 4-pentoxy-4'-cyanobiphenyl
8.75% of 4-hexoxy-4'-cyanobiphenyl
10.01% of 4-(trans-4-pentylcyclohexyl)-4'-cyanobiphenyl
4.97% of 4-pentyl-4'''-cyanoterphenyl
18.76% of 4-(4-propylphenyl)-2-fluoro-4'-cyanobiphenyl
30.00% of 4-pentyl-4'-cyanobiphenyl
in a mixture with 24% of butyl acrylate and 16% of Ebecryl 270, a PDLC film with a wrong morphology is obtained after adding 1% of Darocur® 1116 and curing, while the corresponding precursor containing E 7 as a liquid crystal mixture gives the correct Swiss cheese morphology. This liquid crystal mixture which will be termed in the following as LC II exhibits the following properties:

| clearing point | 95° C. | |
|---|---|---|
| dielectrical anisotropy | 17.0 | (1 kHz, 20° C.) |
| birefringence | 0.267 | (589 nm, 20° C.) |

The reason for the deterioration of the morphology of the cured system might be seen in the more complex composition of the liquid crystal mixture containing 7 compounds and/or in the higher percentage of 3-ring compounds.

The situation is even worse when a liquid crystal mixture containing one or more non-carbonitriles according to formula I is used as is demonstrated by the following table 2; the liquid crystal mixture used is designated as LC I, consists of
17.88% of 1-(4-ethyl-2-fluoro-biphenyl-4'-yl)-2-(4-chlorophenyl)-ethane
9.09% of 1-(4-propyl-2-fluoro-biphenyl-4'-yl)-2-(4-chlorophenyl)-ethane
18.23% of 1-(4-pentyl-2-fluoro-biphenyl-4'-yl)-2-(4-chlorophenyl)-ethane
11.60% of 1-(trans-4-propylcyclohexyl)-2-(4-chloro-2'-fluoro-biphenyl-4'-yl)-ethane
13.20% of 1-(trans-4-propylcyclohexyl)-2-(3-fluoro-4-chloro-2'-fluoro-biphenyl-4'-yl)-ethane
10.06% of 4-(trans-4-propylcyclohexyl)-3',4'-difluorobiphenyl
15.00% of 4-(trans-4-pentylcyclohexyl)-3',4'-difluorobiphenyl
5.00% of 4-(trans-4-pentylcyclohexyl)-fluorobenzene and exhibits the following properties:

| | |
|---|---|
| clearing point | $T_c = 81°$ C. |
| viscosity | $= 27$ mm$^2$ s$^{-1}$ (20° C.) |
| birefringence | $n = 0.1783$ (20° C., 589 nm) |
| ordinary index of refraction | $n_o = 1.5184$ (20° C., 589 nm) |

TABLE 2

| liquid crystal mixture | precursor of the polymer matrix | | morphology of the PDLC film |
|---|---|---|---|
| | monomer | oligomer | |
| 60% of LC I | 24% of BA | 16% of E 270 | wrong morphology |
| 80% of LC I | 8% of BA | 12% of E 270 | wrong morphology |
| 30% of LC I | 15% of BA | 15% of E 270 | wrong morphology |
| 60% of LC I | 24% of BA | 16% of E 600 | wrong morphology |
| 60% of LC I | 16% of BA | 24% of E 600 | wrong morphology |
| 60% of LC I | 24% of BA | 16% of E 1810 | wrong morphology |
| 60% of LC I | 16% of BA | 24% of E 1810 | wrong morphology |

In table 2 BA means butylacrylate while the abbreviations E 270, E 600 and E 1810 are the commercially available oligomers Ebecryl 270, Ebecryl 600 and Ebecryl 1810. The PDLC film is obtained by addition 1% of a Darocur® 1116 to a homogenous mixture of LC I and the precursor of the polymer matrix followed by irradiation. The resulting morphology is assessed by microscopy.

One takes from table 2 that it is very difficult to obtain a PDLC film with the correct Swiss cheese morphology in case the liquid crystal mixture contains one or more SFM-compounds according to formula I wherein Q=CF$_2$, OCF$_2$, C$_2$F$_4$, OC$_2$F$_4$ or a single bond and Y is H, Cl or F, and that the methods outlined in Y. Hirai et al. loc. cit. fails for a wide range of the monomer/oligomer ratio and for different oligomers.

The same is true if the liquid crystal mixture is based on carbonitriles and exhibits a complex composition of at least 6 and especially at least 7 liquid crystalline compound and/or contains a larger amount of 3- and/or 4-ring compounds with the ratio of the percentages of 3- and 4-ring compounds to 2-ring compounds being at least 0.18 and especially higher than 0.2. The term 'based on carbonitriles' is to indicate that the liquid crystalline mixture contains at least 30%, especially more than 40% and in particular not less than 45% of one or more carbonitrile compounds.

In WO 89/06264 and F. G. Yamagishi, SPIE Vol. 1080. Liquid Crystal Chemistry, Physics and Applications, p. 24 it is suggested that adding a multifunctional thiol compound to an acrylate based precursor of the polymer matrix, considerably increases the tendency for forming the correct Swiss cheese morphology which is presumably due to a change of the mechanism of polymerization: the addition of one or more multifunctional thiol compounds favors the mechanism and the production of the Swiss cheese morphology while purely acrylate based precursors are likely to react via the chain mechanism which favors PDLC films with the wrong morphology. The systems described in WO 89/06,264 and in Yamagishi, loc. cit. are often characterized, however, by high to very high switching voltages and they often exhibit electrooptical properties which do not fulfill all practical demands to a desired degree.

It was further found out in extensive experiments that liquid crystal mixtures containing at least one compound according to formula I often exhibit an insufficient solubility in customary precursors of the polymer matrix consisting of one or more acryl oligomers and one or more at least difunctional thiol monomers and/or oligomers. The solubility of the liquid crystal mixtures both in the precursor of the matrix and the single components of it is often less than 25% or even not more than 20%. A PDLC film with such a low liquid crystal content, however, usually results in an insufficient contrast.

It was further found out that the solubility of the liquid crystal mixture containing one or more compounds of formula I, in the precursor of the polymer matrix can be drastically increased if the latter comprises a component A containing and one or more multifunctional thiol monomers, a further component B containing one or more olefinically unsaturated monomers (i.e. compounds of the -ene type) and a further component C containing one or more olefinically unsaturated oligomers.

The solubility of liquid crystal mixtures containing at least one compound of formula I, in the thiol component of the precursor of the polymer matrix often is especially low so that the precursor of the polymer matrix preferably exhibits a mass content of the thiol component of less than 35% and especially not more than 25%, with respect to the mass of the precursor of the polymer matrix.

Examples of at least difunctional thiol compounds (=compounds with at least two SH-groups) suited for component A are glycol dimercaptoacetate, pentaerythritol tetra(3-mercaptopropionate), pentaerythritol tetrathioglycolate, trimethylolethane tri(3-mercaptopropionate), trimethylolpropane tri(3-mercaptopropionate), trimethylolpropane trithioglycolate, dipentaerythritol hexa(3-mercaptopropionate) and polyethylene glycol dimercaptoacetate.

The compounds enumerated are intended to be illustrative without limiting the scope of the invention. Especially preferred are trimethylolpropanetri(3-mercaptopropionate) and pentaerythritol tetramercaptopropionate. Component A can contain monomers and/or oligomers other than thiols in order to increase, for example, the solubility of the liquid crystal mixture in component A. Component A, however, usually contains more than 50% and especially more than 70% of thiol compounds (with respect to the mass of component A). The precursor of the polymer matrix preferably contains not more than 35%, especially less than 25% and, in particular, not more than 20% of component A, these percentages being referred to the mass of the precursor of the matrix. In particular, the percentage of component A is less than 15%.

It was found that the correct Swiss cheese morphology is distinctly favored by adding even small amounts of one or more thiol monomers and/or oligomers of not more than 12.5%, in particular less than 10% and very specifically not more than 7.5% with respect to the mass of the precursor of the matrix. If the amount of the thiol component A is chosen too high this often adversely affects the solubility of the liquid crystal mixture in the precursor.

Component B contains one or more olefinically unsaturated monomers such as vinyl chlorides, vinylidene chlorides, acrylonitriles, methacrylonitriles, acrylamides, methacrylamides, methylacrylates or methacrylates, ethylacrylates or methacrylates, n- or tert-butylacrylates or methacrylates, cyclohexylacrylates or methacrylates, 2-ethylhexylacrylates or methacrylates, benzylacrylates or methacrylates, phenyloxyethylacrylates or methacrylates, hydroxyethylacrylates or methacrylates, hydroxypropylacrylates or methacrylates, lower alkoxyethylacrylates or methacrylates, tetrahydrofurfuryl acrylates or methacrylates, vinyl acetates, vinyl propionates, vinyl acrylates, vinyl succinates, N-vinylpyrrolidones, N-vinylcarbazoles, styrenes, divinylbenzenes, ethylene diacrylates, 1,6-hexandiol diacrylates, bisphenol A diacrylates and dimethacrylates, trimethylolpropane diacrylates, pentaerythritol triacerylates, triethylene glycol diacrylates, ethylene glycol dimethacrylates, tripropylene glycol triacrylates, pentaerythritol triacrylates, pentaerythritol tetracrylates, ditrimethylpropane tetraacrylates aid dipentaerythritol pentaacrylates or hexaacrylates.

The compounds enumerated are intended to be illustrative without limiting the scope of the invention. Especially preferred are acrylate type compounds. The functionality of the acrylate type compounds, i.e. the number of ene-groups, preferably is 1, 2 or 3 and, in particular, 1 or 2.

Component B can contain polymerizable monomers other than ene-type compounds like, for example, compounds with two or more hydroxyl groups, two or more isocyanate groups, a hydroxyl group and/or an isocyanate group and another poly merizable group or other compounds in order to influence and optimize the properties of the polymeric matrix. The mass ratio of olefinically unsaturated monomers and, in particular, acrylate monomers preferably is more than 60% and especially not less than 75% related to the mass of component B. The mass ratio of component B with respect to the mass of the precursor of the polymer matrix amounts to 5-95%, preferably to 10-95%, in particular, to 10-90% and especially preferably to at least 20%.

Component C contains one or more olefinically unsaturated oligomers such as, for example, the commercially available oligomers Ebecryl 270 (aliphatical urethane/diacrylate), Ebecryl 1810 (polyester/tetraacrylate) and/or Ebecryl 600 (bisphenol-A-epoixy/diacrylate). other oligomers can be used, and the examples given are to illustrate the invention without limiting it. Oligomers other than of the acrylate type can be used but component C usually contains not less than 75% and especially more than 85% of acrylate type oligomers, with acrylate type oligomer denoting an oligomer containing at least one unsaturated group of the following formula The precursor of the polymer matrix preferably contains 2-55%, in particular 3-45% and especially preferred not less than 5% of component C.

It was found that adding of the oligomer component C to the precursor of the matrix is essential and an important feature of the present invention because this often optimizes the solubility behavior of the liquid crystal mixture both in the precursor of the matrix and in the cured matrix and furthermore leads to improved optical properties of the electrooptical system.

The precursor of the polymer matrix can contain other components such as, for example, softening agents, stabilizing agents or other additives customary in the field of polymers. The percentage of such and further additions is, however, preferably small and does in particular, not exceed 7.5% and is especially less than 5%. Additives often tend to lower the specific resistance of the cured matrix thus decreasing the holding ratio.

It was found that the solubility of liquid crystal mixtures containing one or more SFM-compounds of formula I in precursors of the described type containing 3 components A, B and C, is sufficient or even good or very good. The precursor of the PDLC film preferably contains 30-85 wt. % and, in particular, 40-85 wt. % and especially not less than 60% of a liquid crystal mixture containing at least one SFM-compound of formula I. The mass portion of the precursor of the polymer matrix with respect to the precursor of the PDLC film preferably amounts to 10-68% and especially to 12-5-60%.

Especially preferred is a system containing 75-85% of a SFM-based liquid crystal mixture and a precursor of the polymer matrix comprising 0.5-2.5% of one or more thiol monomers and/or oligomers 80-95% of one or more monomers of the ene type 7.5-17.5% of one or more oligomers of the ene type.

It was further found that the solubility of liquid crystal mixtures which are based on carbonitriles of formula I and contain at least 6 and especially at least 7 compounds and/or exhibit a rather high percentage of 3-ring- and 4-ring-compounds, in precursors containing 3 components A, B and C, is sufficient or even good or very good. The mass ratios given above for systems with liquid crystal mixtures containing one or more SFM compounds also apply for systems with carbonitrile based liquid crystal mixtures. Especially preferred are PDLC films the precursor of which contains at least 55% and, in particular, at least 60% of a carbonitrile based liquid crystal mixture.

The precursor of the matrix and the liquid crystal mixture are termed to be soluble in each other if a mixture of both forms a clear solution at room temperatures or at elevated temperatures.

In case of PIPS technology, which is preferred, a photoinitiator is added to the mixture resp. to the clear solution. Photoinitiators forming radicals are preferred; examples of suitable photoinitiators are given, for example, in DE 41 04 183. The mass ratio of the photoinitiators, related to the mass of the precursor of the PDLC film, preferably is 0,1-5% and especially 0.5-3%.

The cured PDLC film according to the invention exhibits a Swiss cheese morphology. Taking into account the ranges for the percentages of the different components mentioned above, the expert can easily determine without any inventive effort the optimum ratio of the liquid crystal mixture, the thiol component A and the acrylate-based components B and C of the precursor of the matrix in each specific case. Usually a few experiments are sufficient to evaluate optimum concentration ranges for the different components. The electrooptical system according to the invention exhibits a high or very high holding ratio and is therefore very well suited for active matrix addressing which is due to the careful selection of the liquid crystal mixture and the precursor of the polymer matrix.

Other important characteristics of the electrooptical systems according to the invention are the threshold voltage $V_{10}$ resp. the saturation voltage $V_{90}$. At the threshold voltage $V_{10}$ 10% of the maximum transmission for a specific device is observed, and correspondingly 90% of the maximum transmission at $V_{90}$. The electrooptical system especially have to exhibit low switching voltages $V_{10}$ and $V_{90}$ in order to be compatible with customary active matrix electrode films which are usually based on TFT transistors.

It was now found in the present invention that the threshold voltage increases with increasing concentration of olefinically unsaturated monomers of component B and/or oligomers of component C of the precursors of the matrix exhibiting two or more ene-groups of the formula The effect obtained when introducing components with at least two ene-groups into component B and C and varying their mass ratio, can be taken from table 3.

by adjusting the overall functionality of ene-components B and C (see below) to be not more than 1.85.

Figure 1:
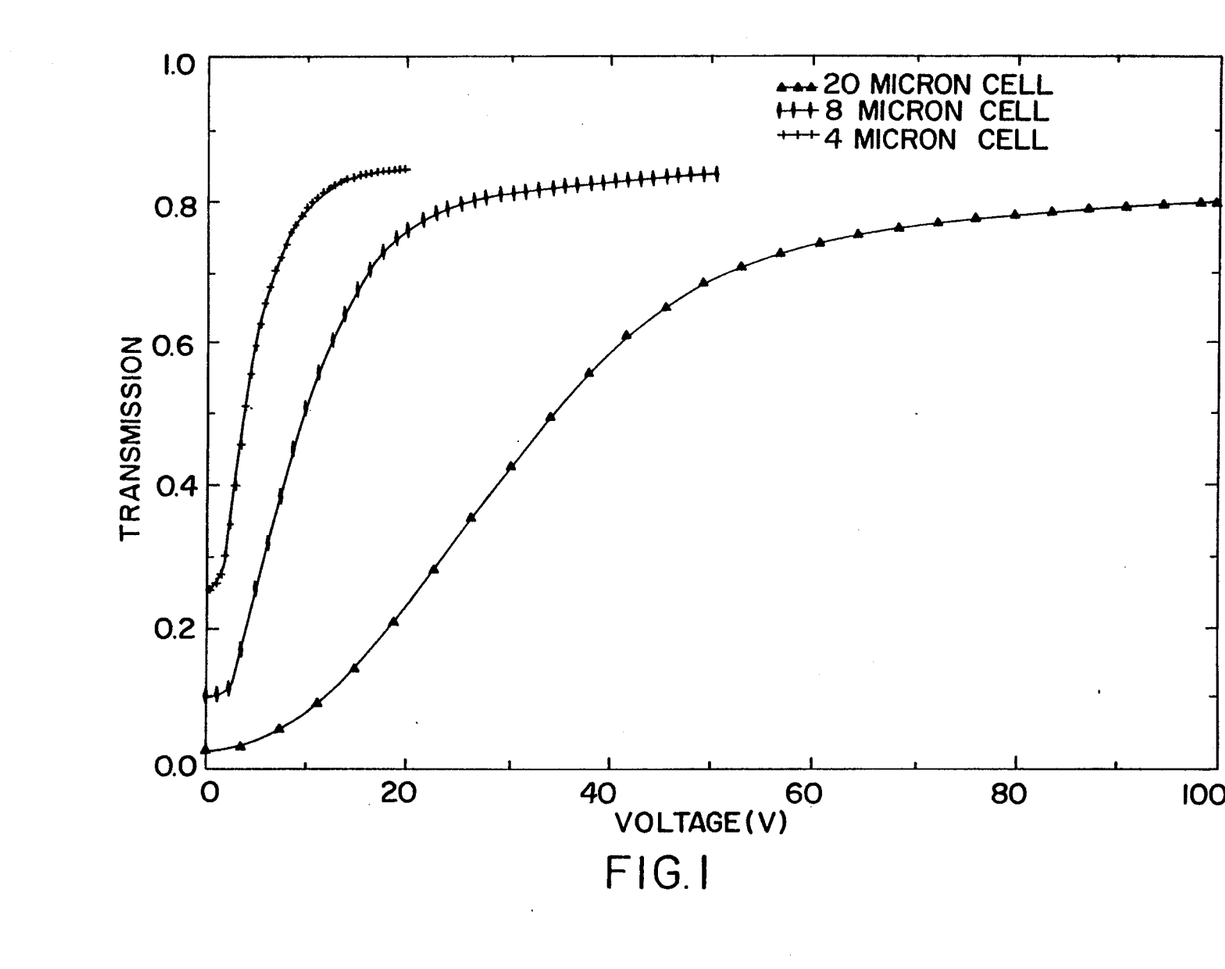
FIGS. 1-4 show characteristic lines for electrooptical systems of the variability of transmission with varied voltage applied.
Figure 2:
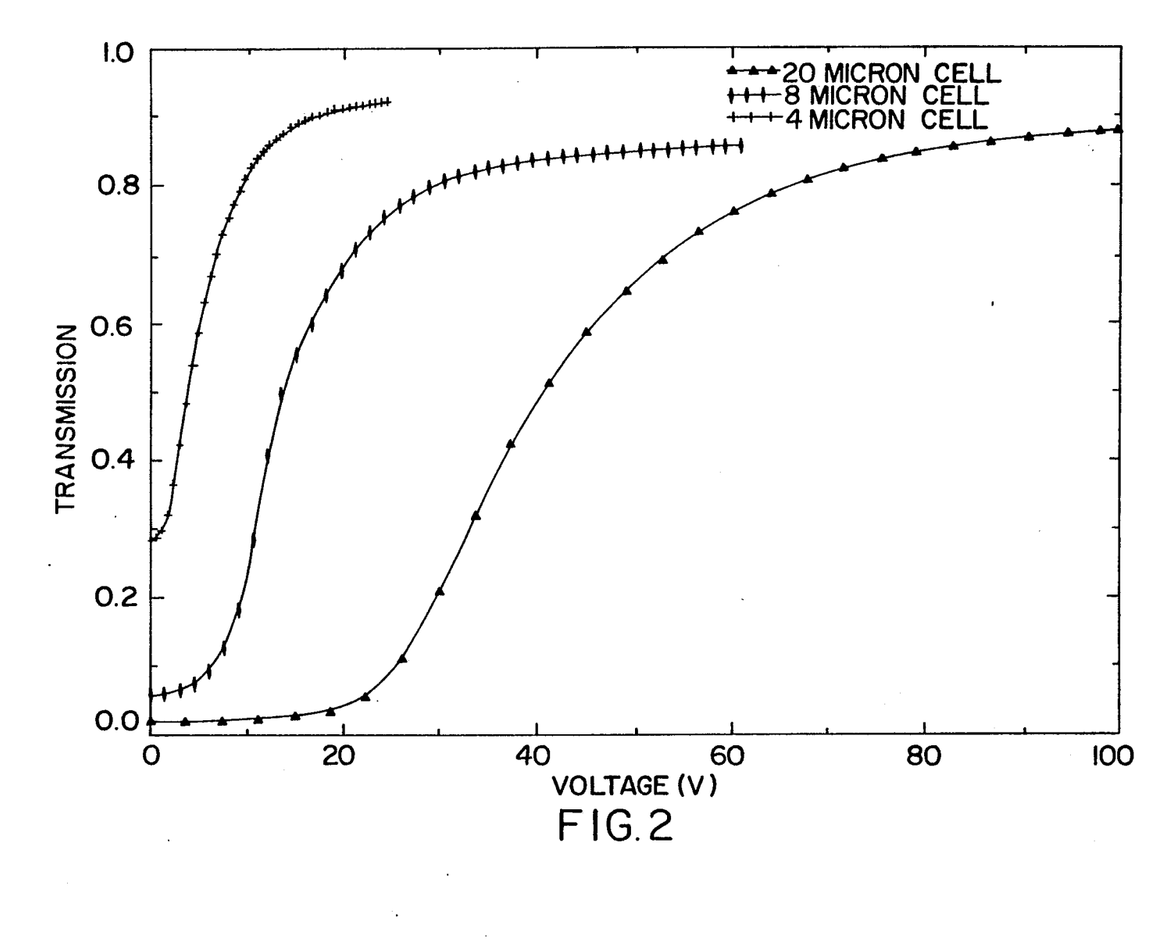
Figure 3:
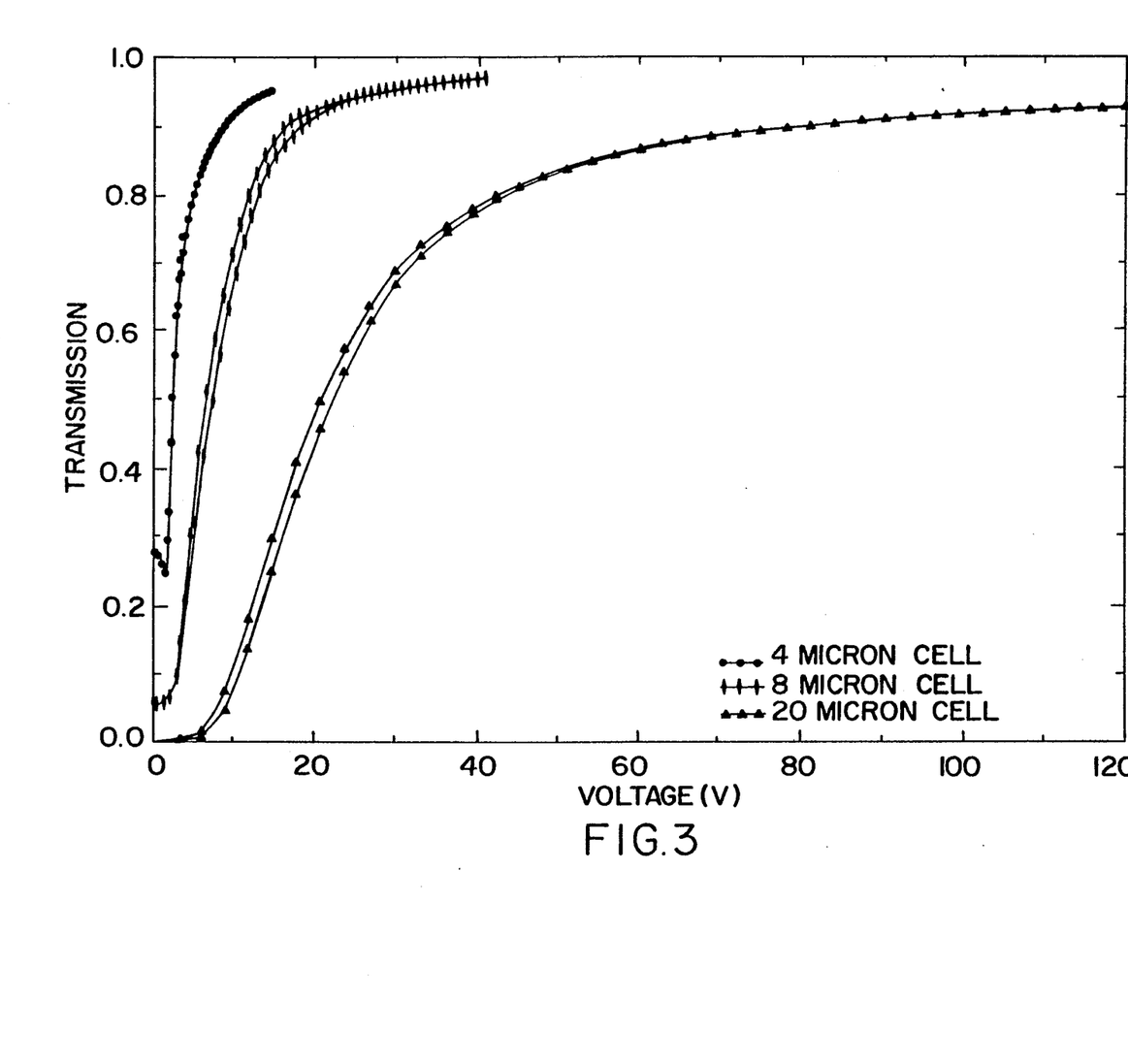

The electrooptical characteristic lines for experiments nos. 1-3 of table 3 are shown in FIGS. 1-3; the transmission axis in each case refers to a measurement with the corresponding Polymer film containing no liquid crystal.

In these figures both the transmission curves for the upward and downward run are identical for experiments 1 and 2 while a slight but still acceptable hysteresis is observed in experiment 3. A reversible electrooptical line is obtained in case the PDLC film forms a Swiss cheese morphology while a strong hysteris is found for the wrong or polymer ball morphology. It was confined by microscopy that in all 3 experiments no. 1-3 the PDLC film exhibits a Swiss cheese morphology.

The holding ratio of the PDLC film obtained in experiment 1-3 was excellent.

Figure 4:
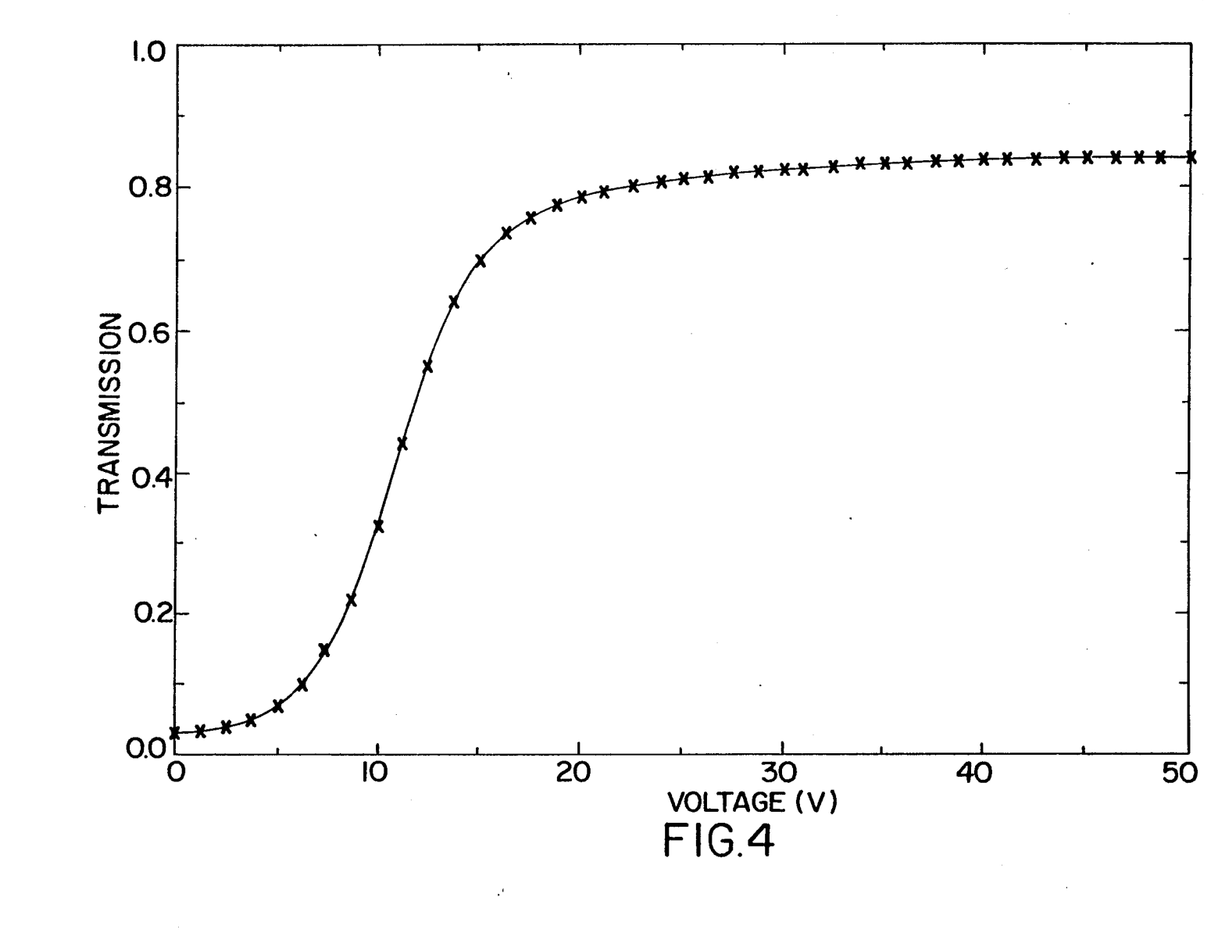

In FIG. 4 the electrooptical characteristic line is shown for an electrooptical system according to the present invention the precursor of which has the following composition:

TABLE 3

| | Exp. No. | | | | | | | | |
|---|---|---|---|---|---|---|---|---|---|
| | 1 | | | 2 | | | 3 | | |
| | chemical composition of the precursor of the PDLC film | | | | | | | | |
| Liquid crystal mixture | 65% LC I | | | 65% LC I | | | 67% LC I | | |
| Component A | 4% TMPTMP | | | 4% TMPTMP | | | 3% TMPTMP | | |
| Component B | 13% BA | | | 12% BA | | | 15% BA | | |
| | 5% HDDA | | | 8% HDDA | | | 2% HDDA | | |
| Component C | 12% E 270 | | | 10% E 270 | | | 12% E 270 | | |
| Photoinitiator | 1% D 1773 | | | 1% D 1173 | | | 1% D 1173 | | |
| | electrooptical properties of the electrooptical system | | | | | | | | |
| thickness of PDLC film [μm] | 20 | 10 | 4 | 20 | 10 | 4 | 20 | 8 | 4 |
| $T_{OFF}$ | 0.03 | 0.10 | 0.25 | 0.02 | 0.06 | 0.28 | 0.00 | 0.06 | 0.275 |
| $T_{ON}$ | 0.80 | 0.82 | 0.83 | 0.88 | 0.89 | 0.92 | 0.93 | 0.97 | 0.97 |
| $V_{90}$ [V] | 60 | 20 | 9.80 | 73 | 26 | 13 | 51.5 | 14 | 8 |

In table 3 LC I is the liquid crystal mixture described above. TMPTMP denotes trimethylolpropanetri(3-mercaptopropionate), BA is butyl acrylate, HDDA is hexandioldiacrylate, D 1173 is Darocur ® 1173 and E 270 is Ebecryl 270 and aliphatic urethane diacrylate. The saturation voltage $V_{90}$ is defined above; $T_{OFF}$ and $T_{ON}$ are the values of transmission in the off- and in the on-start; a transmission of 1.0 refers to a cell containing the fully cured polymer only. The percentages given refer to the mass of the precursor of the PDLC film.

It is evident from table 3 that the saturation voltage $V_{90}$ increases with increasing concentration of the difunctional ene-compounds HDDA and E 270. In experiment no. 3 where a total concentration of difunctional—both monomeric and oligomeric—ene-compounds of 14% is used, the saturation voltage $V_{90}$ for a cell thickness of 20 μm is found to be 51.5 V. This value rises to 60 V resp. 73 V for a total concentration of the ene-compounds of 17% in experiment no. 1 resp. 18% in experiment no. 2 with the film thickness being kept constant.

The reason for this dependency obviously is that the mean diameter of the microdroplets decreases with increasing concentration of di- or polyfunctional ene-compounds (both monomeric and polymeric) because of the increasing number of crosslinking functional groups; this could be confirmed by microscopy.

On the other hand, a certain percentage of di- or higher functional ene-compounds is desired in order to obtain a crosslinked matrix. The present inventors found that these two demands are optimally answered

| Liquid crystal mixture | 60% | LC II |
|---|---|---|
| Component A | 3.96% | TMPTMP |
| Component B | 18.0% | EHA |
| | 4.8% | HDDA |
| Component C | 12.24% | E 270 |
| Photoinitiator | 1% | D 1173 |

The thickness of the PDLC film is 20 μm, and EHA is 2-ethylhexanol-acrylate. One takes from FIG. 4 that the cured film exhibits a Swiss cheese morphology, a low switching voltage $V_{10}$ and good values of $T_{ON}$ and $T_{OFF}$.

In extensive investigations the results obtained in the experiments described could be generalized and it was shown that PDLC films with a correct Swiss cheese morphology can easily be obtained if the precursor of the PDLC film contains a liquid crystal mixture with at least one compound of formula I and a precursor of the polymer matrix comprising components A, B and C.

The liquid crystal mixture preferably contains at least 30-85 wt. % of so-called SFM compounds (superfluorinated materials) according to formula I wherein Q is $CF_2$, $OCF_2$, $C_2F_4$, $OC_2F_4$ or a single bond and Y is H, F or Cl in case the system is addressed via an active matrix.

Electrooptical systems with good properties were also obtained if the liquid crystal mixture is based on compounds with a terminal-CN group; the percentage of these compounds with a terminal-CN group with respect to the mass of the liquid crystal mixture preferably is more than 30% and up to 100% as is the case in LC II. The improvement of the electrooptical properties of such electrooptical system according to the present invention the liquid crystal mixture of which contains one or more compounds with a terminal-CN group, with respect to conventional PDLC system containing liquid crystal mixture with carbonitriles, is especially striking if the liquid crystal mixture exhibits a more complex composition and especially at least 6 and, in particular, 7 or more compounds and/or if the ratio of 3- and 4-ring compounds to 2-ring compounds is not less than 0.18 and especially higher than 0.2.

Electrooptical systems the liquid crystal mixture of which is being based on carbonitriles, however, usually exhibit a lower holding ratio HR especially at higher temperatures and when being exposed to UV irradiation, so that electrooptical systems according to the present invention the liquid crystal mixture of which is being based on SFM-compounds or even completely consists of SFM-compounds, often are especially preferred, in particular for high information content display applications. Electrooptical systems the liquid crystal mixture of which is being based on SFM compounds exhibit a high holding ratio and are well suited for active matrix addressing. Electrooptical system according to the present invention the liquid crystal mixture of which contains both one or more SFM-compounds and one or more carbonitriles, also exhibit preferred properties.

The ratio of monofunctional ene-compounds (both monomeric and oligomeric) to di- or polyfunctional ene-compounds (both monomeric and oligomeric) has to be chosen carefully in order to establish optimal switching voltages and to reliably obtain a crosslinked matrix. The ratio of the mass percentages of monomers and/or oligomers of component B and/or C with one ene group (monofunctional enes) to such with two or more ene groups (polyfunctional enes) is preferably chosen between $$0.25 < \frac{\text{percentage of monofunctional enes}}{\text{percentage of polyfunctional enes}} < 25$$

in particular, between 0.3 and 20 and especially preferred between 0.5 and 15.

The overall functionality of the monomeric and oligomeric ene-components B and C is preferably not more than 1.85, in particular, less than 1.8 and especially preferred not more than 1.75. The overall functionality of the ene-components B and C in examples 1–4 given above, is

| example | overall functionality of ene-components B and C |
|---------|--------------------------------------------------|
| 1 | 1.57 |
| 2 | 1.73 |
| 3 | 1.69 |
| 4 | 1.49 |

The percentage of polyfunctional enes (both monomeric and polymeric) related to the mass of the precursor of the PDLC film is, on the other hand, preferably not too low and, in particular, is chosen to be larger than 0.5%. Especially preferred are electrooptical systems wherein the percentage of di- or higher functional enes, related to the mass of the precursor of the PDLC system, is not smaller than 1.0%.

It was further found out that the ratio of mass percentages of monofunctional monomers of component B to polyfunctional monomers of component B is preferably chosen between $$0.8 < \frac{\text{percentage of monofunctional ene-monomers}}{\text{percentage of polyfunctional ene-monomers}} < 20$$

and, in particular, between 1 and 17.5. In experiments 1–4, this ratio is

| experiment | ratio of percentages of monofunctional to polyfunctional ene-monomers |
|------------|----------------------------------------------------------------------|
| 1 | 2.6 |
| 2 | 1.5 |
| 3 | 7.5 |
| 4 | 3.75 |

The polyfunctional subcomponent of component B and/or C can comprise one or more polyfunctional enes. Preferred are compounds wherein at least one of the ene-groups is an acryloyl group of the formula Especially suited polyfunctional ene-compounds are listed above. It was especially surprising that the mean diameter of the microdroplets can be influenced and optimized by adding polyfunctional ene-compounds and varying their concentration without affecting adversely the morphology of the PDLC films and the HR of the electrooptical system according to the invention.

Varying the concentration of the polyfunctional ene-compounds was found to have a marked influence on $V_{10}$ respective $V_{90}$ while the influence on $T_{ON}$ and $T_{OFF}$ was less striking.

The electrooptical systems according to the present invention are characterized by advantageous properties. They exhibit the correct Swiss cheese morphology, a high holding ratio and their switching voltages $V_{90}$ and $V_{10}$ and switching times can be optimized with respect to the intended application. The electrooptical systems according to the invention do not exhibit the shortcomings of the systems known hitherto or exhibit them only to a lesser extent and they are therefore of considerable economic importance.

The examples given above are intended to illustrate the invention without limiting it. The percentages given throughout the specification are percentages by weight.

We claim:

1. An electrooptical system comprising:
   2 electrode layers and a PDLC film therebetween,
   wherein the PDLC film comprises a liquid crystal mixture forming micro-droplets in an optically isotropic, transparent polymer matrix, wherein one of the refractive indices of the liquid
crystal mixture is matched to the refractive index
of the polymer matrix, wherein one of the electrode layers is an active matrix
having nonlinear addressing elements each integrated with an image point, while the other electrode layer is the counter electrode, wherein the transmission of the system is variable
dependent upon an applied electrical voltage, essentially independent of the polarization of incident
light, and wherein precursor comprises a) 30–85 wt. % of a liquid crystal mixture containing
one or more compounds of the formula I in which $Z^1$ and $Z^2$, independently of one another,
are a single bond, —CH$_2$CH$_2$—, —COO—,
—OCO— or —C≡C—, independently of one another, are trans-1,4-cyclohexylene, 1,4-phenylene, 2-fluoro-1,4-phenylene, 3-fluoro-1,4-phenylene, 2,3-difluoro-1,4-phenylene or 3,5-difluoro-1,4-difluoro-1,4-phenylene
and one of is also pyrimidine-2,5-diyl, pyridine-2,5-diyl or
trans 1,3-dioxane-2,5-diyl, $X^1$ and $X^2$, independently of one another, are H or F, Q is CF$_2$, OCF$_2$, C$_2$F$_4$, OC$_2$F$_4$ or a single bond, Y is H, F, Cl or CN, n is 0, 1 and 3, and R is alkyl having up to 13 C atoms, in which one or
two non-adjacent CH$_2$ groups can also be replaced
by —O— and/or —CH=CH—;

b) 10–68 wt. % of a precursor of a polymer matrix
comprising a component A containing 0.1–35 wt. % of one or
more at least difunctional thiol monomers and-
/or oligomers, a component B containing 5–95 wt. % of one or
more monomers of the ene type, and a component C containing 2–55 wt. % of one or
more oligomers of the ene type, and c) 0.1–5 wt. % of a radical photoinitiator with the
mass ratios given under a), b) and c) being based on
the mass of the precursor of the PDLC film and the
mass ratios of the components A, B and C based on
the mass of the precursor of the polymer matrix.

2. Electrooptical system according to claim 1
wherein component B contains at least one difunctional
monomer of the ene type.

3. An electrooptical system according to claim 1,
wherein the liquid crystal mixture in the precursor of
the PDLC film contains at least 30–85 wt. % of one or
more compounds according to formula I, wherein Q is
CF$_2$, OCF$_2$, C$_2$F$_4$, OC$_2$F$_4$ or a single bond and Y is H,
F or Cl.

4. An electrooptical system according to claim 1,
wherein the liquid crystal mixture in the precursor of
the PDLC film contains more than 30 wt. % of one or
more carbonitrile compounds.

5. An electrooptical system according to claim 1,
wherein the liquid crystal mixture contains at least 60
wt. % of one or more carbonitrile compounds.

6. An electrooptical system according to claim 1,
wherein the liquid crystal mixture comprises at least
60% of the mass of the precursor of the PDLC film.

7. An electrooptical system according to claim 1,
wherein the amount of component A is not more than
25% with respect to the mass of the precursor of the
polymer matrix.

8. An electrooptical system according to claim 7,
wherein the amount of component A is not more than
15% with respect to the mass of the precursor of the
polymer matrix.

9. An electrooptical system according to claim 1,
wherein the amount of component B is at least 20%
with respect to the mass of the precursor of the polymer
matrix.

10. An electrooptical system according to claim 1,
wherein component B of the precursor of the polymer
matrix comprises at least one acrylate compound.

11. An electrooptical system according to claim 1,
wherein the amount of component C is not less than 5%
with respect to the mass of the precursor of the polymer
matrix.

12. An electrooptical system according to claim 1,
wherein component C of the precursor of the polymer
matrix comprises at least one acrylate compound.

13. An electrooptical system according to claim 1,
wherein the ratio of the mass percentages of monomers
and/or oligomers of component B and/or C with one
ene group to such with two or more ene groups is 0.5
and 25.

14. An electrooptical system according to claim 1,
wherein the overall functionality of the ene-components B and C is not more than 1.85.

15. An electrooptical system according to claim 1,
wherein the ratio of mass percentages of monofunctional monomers of component B to polyfunctional
monomers of component B is 0.3 to 20.

16. An electrooptical system according to claim 1,
wherein component B and/or C comprises at least one
polyfunctional subcomponent comprising at least one
compound having at least one acryloyl group.

17. An electrooptical system according to claim 1,
wherein the precursor of the PDLC film comprises
75–85% of a SFM-based liquid crystal mixture and the
precursor of the polymer matrix comprises 0.5–2.5% of
one or more thiol monomers or oligomers, 80–95% of
one or more monomers of the ene type and 7.5–17.5%
of one or more oligomers of the ene type.

18. A precursor of a PDLC film comprising:

a) 30–85 wt. % of a liquid crystal mixture containing
one or more compounds of the formula I in which $Z^1$ and $Z^2$, independently of one another, are a single bond, —CH$_2$CH$_2$—, —COO—, —OCO— or —C≡C—, independently of one another, are trans-1,4-cyclohexylene, 1,4-phenylene, 2-fluoro-1,4-phenylene, 3-fluoro-1,4-phenylene, 2,3-difluoro-1,4-phenylene or 3,5-difluoro-1,4-difluoro-1,4-phenylene and one of is also pyrimidine-2,5-diyl, pyridine-2,5-diyl or trans 1,3-dioxane-2,5-diyl,
$X^1$ and $X^2$, independently of one another, are H or F,
Q is CF$_2$, OCF$_2$, C$_2$F$_4$, OC$_2$F$_4$ or a single bond,
Y is H, F, Cl or CN,
n is 0, 1 and 3, and
R is alkyl having up to 13 C atoms, in which one or two non-adjacent CH$_2$ groups can also be replaced by —O— and/or —CH=CH—;

b) 10–68 wt. % of a precursor of a polymer matrix comprising
   a component A containing 0.1–35 wt. % of one or more at least difunctional thiol monomers and/or oligomers,
   a component B containing 5–95 wt. % of one or more monomers of the ene type, and
   a component C containing 2–55 wt. % of one or more oligomers of the ene type, and c) 0.1–5 wt. % of a radical photoinitiator with the mass ratios given under a), b) and c) being based on the mass of the precursor of the PDLC film and the mass ratios of the components A, B and C based on the mass of the precursor of the polymer matrix.

19. A process for preparing an electrooptical system wherein the precursor of claim 18, which is optionally heated to form a clear solution, is capillary filled together with spacers between 2 glass substrates; one substrate being provided with an active matrix electrode layer and the other being coated with an electrode layer forming the counter electrode; irradiating the system with light of a wavelength sufficient to cure the precursor, between the glass substrates and, thus, forming the electrooptical system.

20. A precursor of a PDLC film according to claim 18, wherein the liquid crystal mixture contains 6 or more compounds.

21. A precursor of a PDLC film according to claim 18, wherein the ratio of 3- and 4-ring compounds to 2-ring compounds is not less than 0.18.

22. A PDLC film formed by curing the precursor of claim 18.

* * * * *